(12) United States Patent
Banić et al.

(10) Patent No.: US 12,602,807 B2
(45) Date of Patent: Apr. 14, 2026

(54) METHOD FOR SUBPIXEL DISPARITY CALCULATION

(71) Applicant: Gideon Brothers d.o.o., Osijek (HR)

(72) Inventors: Nikola Banić, Varaždin (HR); Kruno Lenac, Zagreb (HR); Dario Ljubić, Dakovo (HR); Luka Pevec, Zagreb (HR)

(73) Assignee: Gideon Brothers d.o.o., Osijek (HR)

( * ) Notice: Subject to any disclaimer, the term of this patent is extended or adjusted under 35 U.S.C. 154(b) by 588 days.

(21) Appl. No.: 18/012,861

(22) PCT Filed: Jun. 24, 2021

(86) PCT No.: PCT/EP2021/025230
§ 371 (c)(1),
(2) Date: Dec. 23, 2022

(87) PCT Pub. No.: WO2021/259520
PCT Pub. Date: Dec. 30, 2021

(65) Prior Publication Data
US 2023/0298192 A1 Sep. 21, 2023

(30) Foreign Application Priority Data
Jun. 24, 2020 (EP) .................................... 20020294

(51) Int. Cl.
*G06T 7/593* (2017.01)
(52) U.S. Cl.
CPC .... *G06T 7/593* (2017.01); *G06T 2207/10012* (2013.01); *G06T 2207/20081* (2013.01); *G06T 2207/20084* (2013.01)

(58) Field of Classification Search
CPC ........... G06T 7/593; G06T 2207/10012; G06T 2207/20081; G06T 2207/20084
USPC ....................................................... 382/106
See application file for complete search history.

(56) References Cited

PUBLICATIONS

Fan, Rui, Xiao Ai, and Naim Dahnoun. "Road surface 3D reconstruction based on dense subpixel disparity map estimation." IEEE Transactions on Image Processing 27.6 (2018): 3025-3035. (Year: 2018).*
Fan, Rui, et al. "PT-ResNet: Perspective transformation-based residual network for semantic road image segmentation." 2019 IEEE International Conference on Imaging Systems and Techniques (IST). IEEE, 2019. (Year: 2019).*
Chang, Jia-Ren, and Yong-Sheng Chen. "Pyramid Stereo Matching Network." arXiv preprint arXiv:1803.08669 (2018). (Year: 2018).*
Banić, N. et al., Flash and Storm: Fast and Highly Practical Tone Mapping based on Naka-Rushton Equation, 2018, 7 pages.

(Continued)

*Primary Examiner* — Jonathan S Lee
(74) *Attorney, Agent, or Firm* — Standley Law Group LLP; Jeffrey S. Standley; Bryan P. Finneran

(57) ABSTRACT

In a method for subpixel disparity calculation, image data for various images each representing a field of view of an input device is received by a processor, and the image data is applied to a machine learning model. The machine learning module uses the image data to compute an output representing calculated subpixel disparity between the various images. In an example of the method, the machine learning model is a neural network that produces accurate and reliable subpixel disparity estimation in real-time using synthetically generated data.

16 Claims, 10 Drawing Sheets

(56) References Cited

PUBLICATIONS

Benedetti, L. et al., Color to gray conversions in the context of stereo matching algorithms, Visual Computing Lab, 2010, pp. 1-32.

Cheng, D. et al., Illuminant Estimation for Color Constancy: Why spatial domain methods work and the role of the color distribution, 2014, pp. 1-10.

Kendall, A. et al., End-to-End Learning of Geometry and Context for Deep Stereo Regression, 2017, pp. 66-75.

Lee, H. et al., Real-Time Stereo Matching Network with High Accuracy, 2019, 5 pages.

Nehab, D. et al., Improved Sub-pixel Stereo Correspondences through Symmetric Refinement, 2005, pp. 1-7.

Scharstein, D. et al., High-Resolution Stereo Datasets with Subpixel-Accurate Ground Truth, 36th German Conference on Pattern Recognition (GCPR), Sep. 2-5, 2014, pp. 1-12, Muenster, Germany.

Shimizu, M. et al., Significance and Attributes of Subpixel Estimation on Area-Based Matching, Systems and Computers in Japan, 2003, pp. 1-10, vol. 34, No. 12 (Translated from Denshi Joho Tsushin Gakkai Ronbunshi, vol. J85-D-II, No. 12, Dec. 2002, pp. 1791-1800).

Stone, J.V., Learning Spatio-Temporal Invariances, BMVC, 1994, pp. 681-690.

Tian, Q. et al., Algorithms for Subpixel Registration, Computer Vision, Graphics, and Image Processing, 1986, pp. 220-233, 35.

Tong, W., Subpixel image registration with reduced bias, Optics Letters, Mar. 1, 2011, pp. 763-765, vol. 36, No. 5.

Yu, L. et al., Deep Stereo Matching with Explicit Cost Aggregation Sub-Architecture, The Thirty-Second AAAI Conference on Artificial Intelligence (AAAI-18), 2018, pp. 7517-7524.

Žbontar, J. et al., Stereo Matching by Training a Convolutional Neural Network to Compare Image Patches, Journal of Machine Learning Research, 2016, pp. 1-32, 17.

* cited by examiner

RECEIVE FIRST IMAGE DATA AND SECOND IMAGE DATA GENERATED FOR THE SCENE ⟋ 401

APPLY THE FIRST IMAGE DATA AND THE SECOND IMAGE DATA TO A NEURAL NETWORK ⟋ 402

COMPUTE, BY THE NEURAL NETWORK, A SUBPIXEL OFFSET ⟋ 403

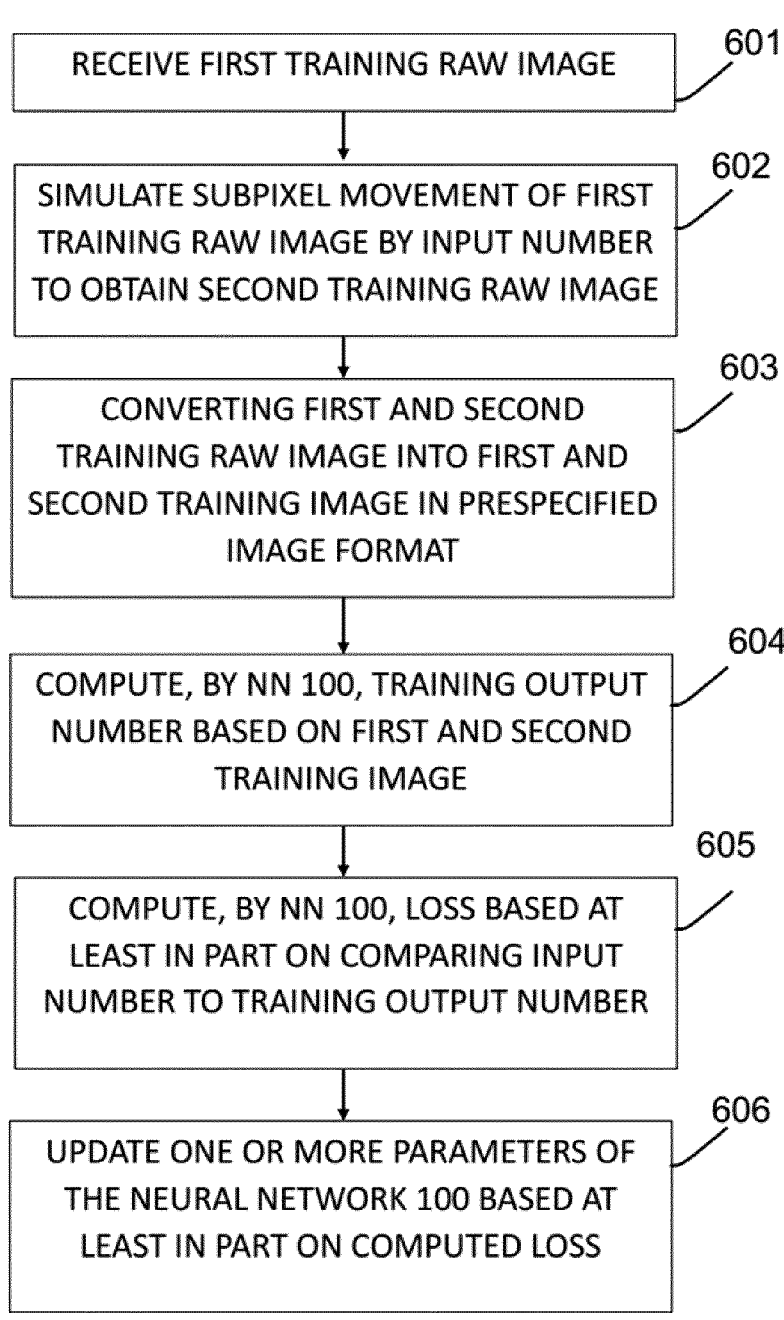

RECEIVE FIRST TRAINING RAW IMAGE 601

SIMULATE SUBPIXEL MOVEMENT OF FIRST TRAINING RAW IMAGE BY INPUT NUMBER TO OBTAIN SECOND TRAINING RAW IMAGE 602

CONVERTING FIRST AND SECOND TRAINING RAW IMAGE INTO FIRST AND SECOND TRAINING IMAGE IN PRESPECIFIED IMAGE FORMAT 603

COMPUTE, BY NN 100, TRAINING OUTPUT NUMBER BASED ON FIRST AND SECOND TRAINING IMAGE 604

COMPUTE, BY NN 100, LOSS BASED AT LEAST IN PART ON COMPARING INPUT NUMBER TO TRAINING OUTPUT NUMBER 605

UPDATE ONE OR MORE PARAMETERS OF THE NEURAL NETWORK 100 BASED AT LEAST IN PART ON COMPUTED LOSS 606

FIG. 6

| Operation layer | Layer size |
|---|---|
| Input feature vector | 286 |
| Fully connected (PReLU) | 512 |
| Dropout | - |
| Batch normalization | - |
| Fully connected (PReLU) | 512 |
| Dropout | - |
| Batch normalization | - |
| Linear output | 1 |

FIG. 8

| Method | Mean squared error ± standard deviation |
|---|---|
| | Flash |
| parabola [1] | 0.00805 ± 0.08957 |
| shifted [2] | 0.00216 ± 0.04635 |
| linear [4] | 0.00330 ± 0.05745 |
| proposed method | 0.00015 ± 0.01244 |
| | Gamma correction |
| parabola [1] | 0.01215 ± 0.11011 |
| shifted [2] | 0.00737 ± 0.08575 |
| linear [4] | 0.00553 ± 0.07436 |
| proposed method | 0.00019 ± 0.01371 |
| | Flash + Gaussian noise |
| parabola [1] | 0.01549 ± 0.12429 |
| shifted [2] | 0.01187 ± 0.10885 |
| linear [4] | 0.03012 ± 0.17349 |
| proposed method | 0.00838 ± 0.09150 |
| | Gamma correction + Gaussian noise |
| parabola [1] | 0.02934 ± 0.17119 |
| shifted [2] | 0.02639 ± 0.16241 |
| linear [4] | 0.06590 ± 0.25669 |
| proposed method | 0.01796 ± 0.13399 |

FIG. 9

| Train set | Test set | | | |
|---|---|---|---|---|
| | Flash | Gamma correction | Flash + Gaussian noise | Gamma correction + Gaussian noise |
| Flash | 0.00015 | 0.00060 | 0.01891 | 0.03132 |
| Gamma correction | 0.00050 | 0.00019 | 0.01935 | 0.03225 |
| Flash + Gaussian noise | 0.00166 | 0.00594 | 0.00838 | 0.01855 |
| Gamma correction + Gaussian noise | 0.00215 | 0.00436 | 0.00913 | 0.01796 |

FIG. 11

| Test set | Mean squared error ± standard deviation |
|---|---|
| Flash | 0.00051 ± 0.02264 |
| Gamma correction | 0.00046 ± 0.02136 |
| Flash + Gaussian noise | 0.00834 ± 0.09133 |
| Gamma correction + Gaussian noise | 0.01723 ± 0.13126 |

FIG. 12

METHOD FOR SUBPIXEL DISPARITY CALCULATION

FIELD OF THE INVENTION

The present invention relates generally to subpixel registration of image features, and more specifically to a computer implemented method, computing device configured to be a neural network, computer program, and computer readable medium related to a subpixel disparity calculation using neural networks.

BACKGROUND OF THE INVENTION

A subpixel registration of image features has a significant impact on the accuracy of computer vision tasks such as stereo vision, digital image correlation, visual simultaneous localization and mapping (SLAM), etc.

A subpixel disparity calculation (or alternatively referred to herein as "subpixel offset estimation" or "subpixel disparity estimation" or "subpixel value estimation" or "subpixel disparity value calculation") has an important role in tasks such as digital image correlation, image registration, stereo depth calculation, and consequently in all techniques that rely on depth estimation. For the sake of simplicity and low computation cost, various systems that require subpixel disparity calculation in practice often rely on biased methods of lower accuracy. Such methods often calculate image patch distances and use them as input for techniques such as parabola fitting, which are theoretically proven to be biased. Even if these techniques were unbiased, merely relying on the distance data is suboptimal since it has been shown to introduce randomness in the whole process, which can be regarded as noise. However, with the ever-growing computational power, increasing the computation cost in order to obtain significant gains in accuracy has become a desired option. Neural networks have proven their merit by solving numerous tasks with high accuracy when enough training data of sufficient quality was available. This is mainly due to their adaptivity and flexibility, which also enables them to be more resistant to noise. Because of that it follows that neural networks with an appropriate architecture should also be able to achieve high accuracy in the subpixel disparity calculation if trained in a proper way on well prepared training data.

One of the most widely used techniques for image subpixel offset estimation is parabola fitting as described in document Q. Tian and M. N. Huhns, Comput. Vision, Graph. Image Process. 35, 220-233 (1986), ref. [1].

A common example of parabola fitting can be found in a stereo vision where every stereo match consists of an image patch $L_0$ in a left image corresponding to an image patch $R_0$ in a right image. A subpixel location offset of the image patch $L_0$ in the right image around the image patch $R_0$ is then obtained by first using a distance metric d to calculate the distances $d(L_0, R_{-1})$, $d(L_0, R_0)$, and $d(L_0, R_1)$ where $R_1$ is a patch that has the position of $R_0$ shifted by i pixels horizontally. Next, a parabola is fitted to said distances and the offset of the location of the parabola's minimum from the location of the image patch $R_0$ is taken as the subpixel offset of the image patch $L_0$ from the image patch $R_0$ in the right image. Usually d is the sum of absolute differences (SAD), the squared sum of differences (SSD), or a similar metric. By using parabola fitting a subpixel offset o can be calculated as:

$$o = \frac{d(L_0, R_1) - d(L_0, R_{-1})}{4d(L_0, R_0) - 2(d(L_0, R_1) + d(L_0, R_{-1}))}. \tag{1}$$

The problem with parabola fitting is that it has a theoretically provable systematic bias that results in a pixel locking, i.e. having subpixel offset estimations shifted closer to integer values.

Improvements of parabola fitting have been proposed for instance in document by M. Shimizu and M. Okutomi, "Significance and attributes of subpixel estimation on area-based matching, Systems and Computers in Japan 33, 1-10 (2002), ref. [2] and in document by D. Nehab, S. Rusinkiewiez, and J. Davis, "Improved sub-pixel stereo correspondences through symmetric refinement," in Tenth IEEE International Conference on Computer Vision (ICCV'05) Volume 1, vol. 1 (IEEE, 2005), pp. 557-563, ref. [3]. Said proposed improvements suffer from bias due to their theoretical foundation. Even merely using SSD introduces unwanted randomness. A method described in document [2] boils down to reducing the bias of parabola fitting by running it twice and then averaging the obtained results. The first run of parabola fitting is performed as usual, while in the second run the left image is shifted for a half pixel by means of interpolation. Before averaging the second result is compensated by ±0.5 depending on the sign of the first result.

Another solution proposed in document by Wei Tong "Subpixel image registration with reduced bias" published in Opt. letters Vol. 36, Issue 5, pp. 763-765 (2011), ref. [4] discloses a backward linear digital image correlation algorithm to obtain subpixel image registration without noise-induced bias for an image set consisting of a noise-free reference image and a number of noisy current images. Approach by [4] is to model the appearance of a patch shifted by a decimal amount of pixels as the linear combination of two neighboring patches, e.g. thinking of $L_0$ as of a convex combination of $R_{-1}$ and $R_0$ or alternatively $R_0$ and $R_1$, where a subpixel offset o may then be calculated as:

$$o = \underset{\lambda}{\arg\min} \, d(L_0, \lambda R_{-1} + (1 - \lambda)R_0). \tag{2}$$

Solution disclosed in document [4] significantly reduces the bias in comparison to the previously mentioned methods, it also relies on the assumptions that one of the images has no noise and that the images are linear, which does not hold because most digital cameras have many non-linear operations in their image processing pipelines.

There have also been proposals to train a neural network to calculate the stereo matching costs, see document "Stereo Matching by Training a Convolutional Neural Network to Compare Image Patches" by J. Žbontar, Y. LeCun et al., J. Mach. Learn. Res. 17, 2 (2016), ref. [5], but even in said document a subpixel refinement is carried out by means of parabola fitting.

Document "Deep Stereo Matching with Explicit Cost Aggregation Sub-Architecture" by Lidong Yu et al., ref. [8] discloses a solution that is also capable of calculating the subpixel disparity by using the soft argmin function on the values of the aggregated cost volume that must first be obtained by applying a deep neural network. Due to its reliance on a wider framework, such calculation may be somewhat impractical If the subpixel disparity is required for only a certain number of patches, e.g. around certain feature points, and especially if they are taken out of the image context, which may be the case in memory optimized solutions interested in only certain pixels.

Document "End-to-End Learning of Geometry and Context for Deep Stereo Regression" by Alex Kendall et al., ref. [9] discloses a solution that is similar to the one in the previously mentioned document by Lidong Yu et al and it also motivated the design of its subpixel calculation mechanism. Because of that, everything that was said earlier about this mechanism, including its properties and disadvantages, applies to this and other existing similar solutions as well.

Document "REAL-TIME STEREO MATCHING NETWORK WITH HIGH ACCURACY" by Hyunmin Lee et al., ref. [10] discloses a solution that also calculates the subpixel disparity in a way similar to the solutions in documents by Alex Kendall et al. and by Lidong Yu et al. Although the soft argmin function here is slightly modified, the core idea remains the same. This document also shows some of the limitations of the soft argmin function for subpixel disparity calculation.

Similar other solutions can be found and many of the most recent ones are often centered around providing improved accuracy for stereo matching, one part of which is also the subpixel disparity calculation. However, separating their subpixel disparity calculation can sometimes be an uneasy task due to the dependence on other structures such as the aggregated cost volume. Additionally, in problems such as real-time SLAM where subpixel disparity is also used, calculating these structures can have a too expensive calculation cost, thus making such approach inappropriate. The same goes for any other solution that requires the calculation of subpixel disparities for only certain pixels. As a matter of fact, if only small image patches are given, many of the stereo matching based solution for subpixel disparity calculation may not be applicable at all.

An additional constraint on many of the recent solutions is the need for reliable datasets. While some of the documents above also mention the use of synthetic datasets, these do not come with reliable subpixel ground-truth, if any at all. What is also problematic is that these synthetic datasets are not always easily generated on demand, and they do not always take into account the variability of image processing pipeline that is found in various cameras and that is necessary to train a robust solution. The existing datasets, even the synthetic ones, often lack specific situations that can be easily simulated if the image processing pipeline is taken into account. Because of all that, the existing solutions do not directly tackle the subpixel disparity calculation in its roots that are found in the photometry and low-level camera processing, but instead often rely on the results of higher-level semantics and calculations. While having any subpixel disparity calculation, including such one, is usually better than having none, for the highest accuracy possible the problem has to be dealt with in its roots. This is why for the best results one of the required resources should be a synthetic data generator centered around photometric properties.

The present invention has been made in view of the above circumstances, and it is an object of the present invention to provide a computer implemented method for a subpixel disparity calculation by using a machine learning model, said method significantly improves the accuracy of the subpixel disparity calculation in relation to existing known methods that are also suitable and generally applicable even in custom application, and not limited only to certain problem types.

SUMMARY OF THE INVENTION

Embodiments of the present disclosure relate to a subpixel disparity calculation using a machine learning model such as neural networks (NN). Systems and methods are disclosed that may use supervised training to train a neural network to calculate a subpixel disparity from given image patches. The present disclosure includes neural networks that may produce comparatively more accurate and reliable results while being deployable in a real-time. Both realistic and synthetically generated image data may be used to train the NN in a supervised manner. By using both realistic and synthetic image data, the benefits of each may be learned by the NN while the drawbacks to each may be mitigated by the other.

In a preferred embodiment of the present invention, synthetically generated image data is used to train the NN in a supervised manner.

Other benefits of the NNs of the present disclosure may relate to the network architecture. For example, instead of relying on precalculated image patch distances, the NNs perform an end-to-end prediction, i.e., they rely directly on the image patches as their input. This reduces the randomness introduced by distance calculation and it helps to increase an overall subpixel disparity calculation accuracy.

Therefore, an object of the present invention is to provide a computer implemented method for a subpixel disparity calculation using neural networks.

Further object of the present invention is to train an end-to-end neural network specifically designed only for the calculation of the subpixel offsets of image patches.

Further object of the present invention is to provide a computing device configured to be a neural network.

A computer implemented method of the present invention comprises following steps: receiving a first image data representative of a first image of a field of view of a first input device generated for a scene and a second image data representative of a second image of a same field of view of a second input device generated for the scene, applying said first image data and said second image data to a machine learning model, computing, by said machine learning model, an output number that stands for a calculated subpixel disparity between said first image and said second image, wherein said machine learning model is a neural network, said neural network is trained in a supervised training mode; and generating synthetic data comprising a plurality of synthetically generated pairs of said first image and said second image, each pair comprising a predetermined subpixel disparity between said first image and said second image. The machine learning model is trained with the synthetically generated data comprising a training set of pairs of training raw image data representative of a pairs of training raw images with an input number representing a ground truth subpixel disparity between each pair of training raw images. The first input device and the second input device each include one or more digital cameras, wherein the first input device and the second input device each include one or more computer readable medium, having a program recorded thereon, where the program is to make a computer control the steps of the computer implemented method. The machine learning model is a neural network trained in a supervised training mode.

The method of the present invention further provides the supervised training mode comprising the following steps: receiving a first training raw image data representative of a first training raw image; simulating a subpixel movement of the first training raw image by the input number to obtain a second training raw image data representative of a second training raw image; converting the first training raw image data representative of the first training raw image into a first training image data representative of a first training image in a prespecified image format by applying a set of non-linear operations; converting the second training raw image data representative of the second training raw image into a second training image data representative of a second training image in the prespecified image format by applying a set of non-linear operations; and obtaining the first training image data and the second training image data. The prespecified image format corresponds to an image format obtained by the digital camera. Further, the method comprises computing, by the neural network, a training output number based on the first training image data and the second training image data; computing, by the neural network, a loss based at least in part on comparing the input number to the training output number; and updating of one or more parameters of said neural network based at least in part on said loss, wherein backpropagation is used for updating of one or more parameters of said neural network.

Further object of the present invention is to provide a computing device configured to be a neural network having a relatively simple network architecture that may include a relatively small number of dense layers that can generalize any architecture for a subpixel disparity calculation.

It is further provided a computer program directly loadable into an internal memory of a computing device, the computer program comprising instructions for performing any one or any combinations of the above provided computer implemented method.

It is further provided a computer readable medium, having a computer program recorded thereon, where the computer program is to make a computer control the steps of a computer implemented method of the present invention.

BRIEF DESCRIPTION OF THE DRAWINGS

Embodiments of the present invention will now be described, by way of non-limiting example, and in reference to the accompanying drawings, where:

FIG. 6 is a flow diagram of an example process of training a neutral network, in accordance with some embodiments of the present invention;

FIG. 8 is a table of an example architecture of a neural network, in accordance with some embodiments of the present invention;

FIG. 9 is a table comparing accuracy of different background art solutions and a computer implemented method in accordance with some embodiments of the present invention for several cases of non-linear operations that simulate various elements of the digital camera pipelines;

FIG. 11 is a table illustrating mean squared errors of a computer implemented method, in accordance with some embodiments of the present invention, on various test sets after training on various train sets; and FIG. 12 is a table illustrating mean squared errors and their respective standard deviations obtained on separate test sets by a computer implemented method in accordance with some embodiments of the present invention trained on combined train sets.

DETAILED DESCRIPTION OF THE INVENTION

Figure 1:
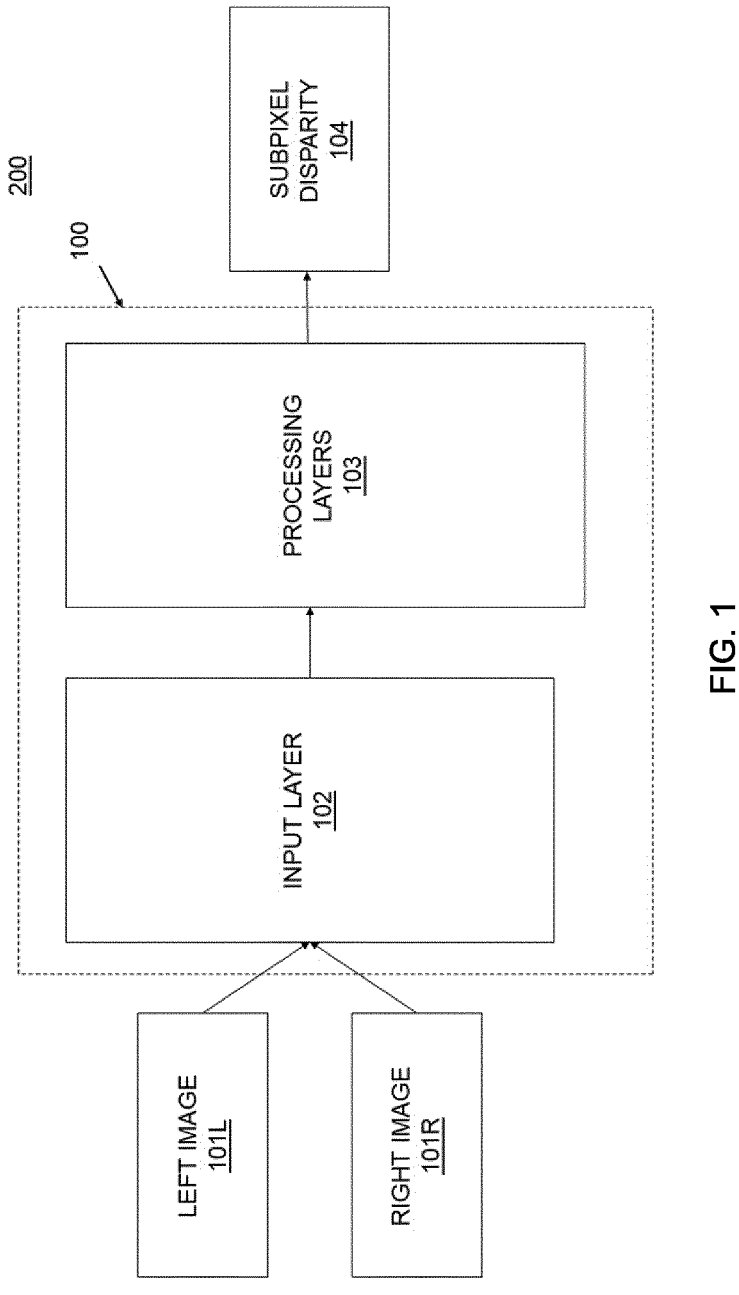
FIG. 1 is a block diagram of a neural network system for a subpixel disparity calculation from stereoscopic images, in accordance with some embodiments of the present invention.

A computer implemented method is disclosed related to a subpixel disparity calculation using neural networks. The present invention may be described with respect to an example sparse depth map calculation device, or an object, such as autonomous vehicles, non-autonomous vehicles, robots, unmanned aerial vehicles, etc., (alternatively referred to herein as "device" or "vehicle" or "sparse map device"). However, this is not intended to be limiting. For example, and without departing from the scope of the present disclosure, the systems, methods, and/or processes described herein may be applicable to digital image correlation, autonomous vehicles, non-autonomous vehicles, robots, unmanned aerial vehicles, virtual reality (VR) systems, augmented reality (AR) systems, and/or any other type of technology that may use subpixel disparity or depth information.

The device also includes one or more computing devices for performing computations for piloting the device during autonomous operation.

The present invention may be described in a general context of a computer code or machine-useable instructions, including computer-executable instructions such as program modules, being executed by a computer device or other machine, such as a personal data assistant or other handheld device. Generally, program modules including routines, programs, objects, components, data structures, etc., refer to code that perform particular tasks or implement particular abstract data types. The present invention may be practiced in a variety of system configurations, including hand-held devices, consumer electronics, general-purpose computers, more specialty computing devices, etc. The present invention may also be practiced in distributed computing environments where tasks are performed by remote-processing devices that are linked through a communications network.

A stereoscopic camera may be calibrated such that disparity values between left and right images of said camera have known depth value conversions. In some non-limiting examples, equation (3) may be used to determine depth values from disparity values:

$$Z = fB/d \tag{3}$$

where Z is a depth for a given pixel, f is a focal length of the stereo camera, B is a baseline distance between a center of a first lens and a center of a second lens of the stereo camera, and d is disparity. This disparity may be composed of a pixel integer part i and a subpixel decimal part s so that d=i+s. A neural network may be used to calculate only d, or it may be used to calculate only i, or it may be used to calculate only s, or it can be used to calculate both i and s.

As such, disparity values may be converted to depth values (e.g., using equation (3), above). The depth values may then be used by the device to generate a depth map based on an understanding of a distance of objects from the device in the environment. Features that can be matched to calculate stereo disparity and thereby range or depth can include visual edges in a stereo image pair, for example. Multiple features can be detected and stereo disparity calculated for each feature pair and interpolated to determine depth.

Neural Network Architecture for Subpixel Disparity Calculation

A neural network (NN) is a computational machine learning method. With NNs, a computational graph is constructed which imitates the features of a biological neural network. The biological neural network includes features salient for computation and responsible for many of the capabilities of a biological system that may otherwise be difficult to capture through other methods. In some implementations, such networks are arranged into a sequential layered structure in which connections are unidirectional. For example, outputs of artificial neurons of a particular layer can be connected to inputs of artificial neurons of a subsequent layer.

Different NNs are different from one another in different perspectives. For example, the topologies or architectures (e.g., the number of layers and how the layers are interconnected) and the weights of different NNs can be different. A weight can be approximately analogous to the synaptic strength of a neural connection in a biological system. Weights affect the strength of effect propagated from one layer to another. The output of an artificial neuron can be a nonlinear function of its inputs. A NN can be trained on training data and then used to determine an output from untrained data.

As disclosed herein, a computing device configured to be a neural network (NN) of a type that can perform simple visual tasks can be programmed to learn how to calculate subpixel disparity of image patches (determine depth maps) from stereoscopic images.

Various examples of the present disclosure include a computing device configured to be a neural network (NN) that produces an accurate and reliable subpixel disparity calculation in a real-time. Synthetic and/or real images may be used to train the NN in a supervised manner and training and calculation of the subpixel disparity are performed in an end-to-end way. The neural network-based subpixel disparity calculation method and system has the advantages that accuracy can be improved, and feasibility and robustness are better.

In contrast to conventional systems, such as those described in the background art, the present invention provides a computing device configured for subpixel disparity neural networks (NNs) that may produce comparatively more accurate and reliable results while being deployable in the real-time. Benefits of the computing device configured for subpixel disparity NNs of the present invention may relate to a relatively simple network architecture. For example, the NN may include a relatively small number of dense layers that can generalize any architecture for the disparity computing.

The outputs of the NN of a computing device in accordance with the present disclosure may include subpixel disparity between input images, and it may be used to obtain a more accurate digital image correlation. Additionally, the subpixel disparity may be used to calculate depth in the field of view of the sensors (e.g., the stereo cameras). The depth information may be useful for a robot, an autonomous vehicle, a drone, a virtual reality system, an augmented reality system, and/or another object or system when navigating through space.

FIG. 1 is an illustration of a subpixel disparity neural network system 200 for a subpixel disparity calculation using stereoscopic images, in accordance with some embodiments of the present invention. The neural network 100 may alternatively be referred to herein as "NN 100." The NN 100 may calculate a subpixel disparity based on input data such as sensor data, e.g., stereoscopic image data representative of a first image 101L and a second image 101R. The input data may include data representative of the images 101 generated from input devices (e.g., one or more stereo cameras) of the device, or another object (e.g., a robot, a drone, a VR system, an AR system, etc.). In some examples, the first image 101L may include a left image, e.g., from a first input device such as a stereoscopic digital camera, and the second image 101R may include a right image, e.g., from a second input device such as the stereoscopic digital camera. The images 101 may have a size of H×W×C, where H is a spatial height of the image, W is a spatial width of the image, and C is the number of input channels (e.g., without limitation, C may be equal to 3). In some examples, each of the images may be resized prior to input to the NN 100. For a non-limiting example, the images may be resized to 11×11. The images 101 may be of any color space, including but not limited to, RGB, HSL, HSV, YUV, YIQ, YDbDr, CIE, etc.

Figure 2:
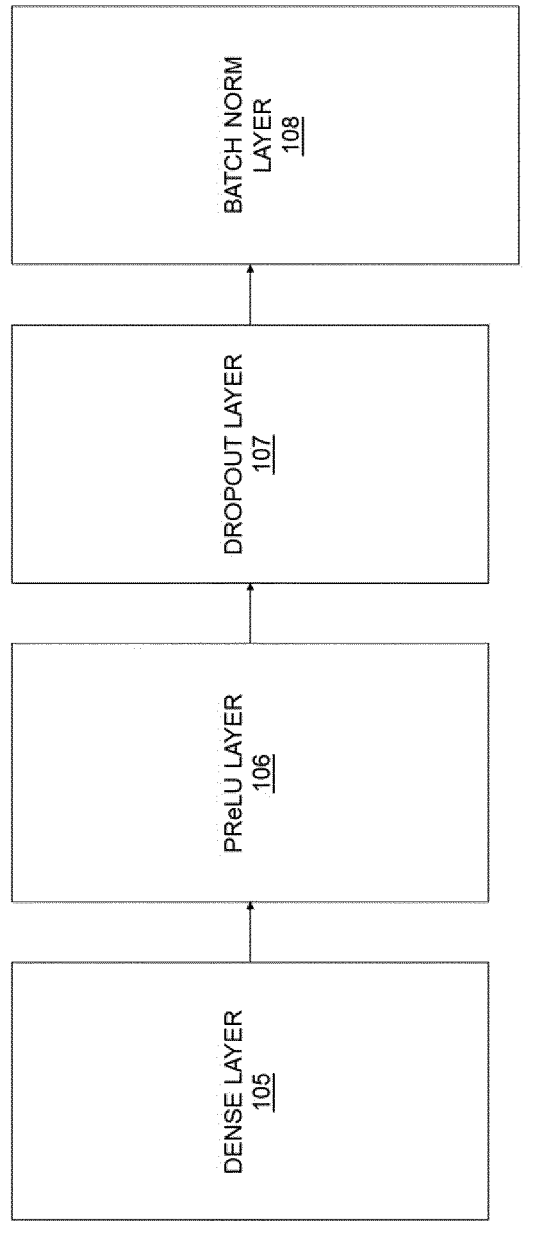
FIG. 2 is a block diagram of a configuration of a block of processing layers that may be repeated several times in a neural network, in accordance with some embodiments of the present invention.
Figure 3:
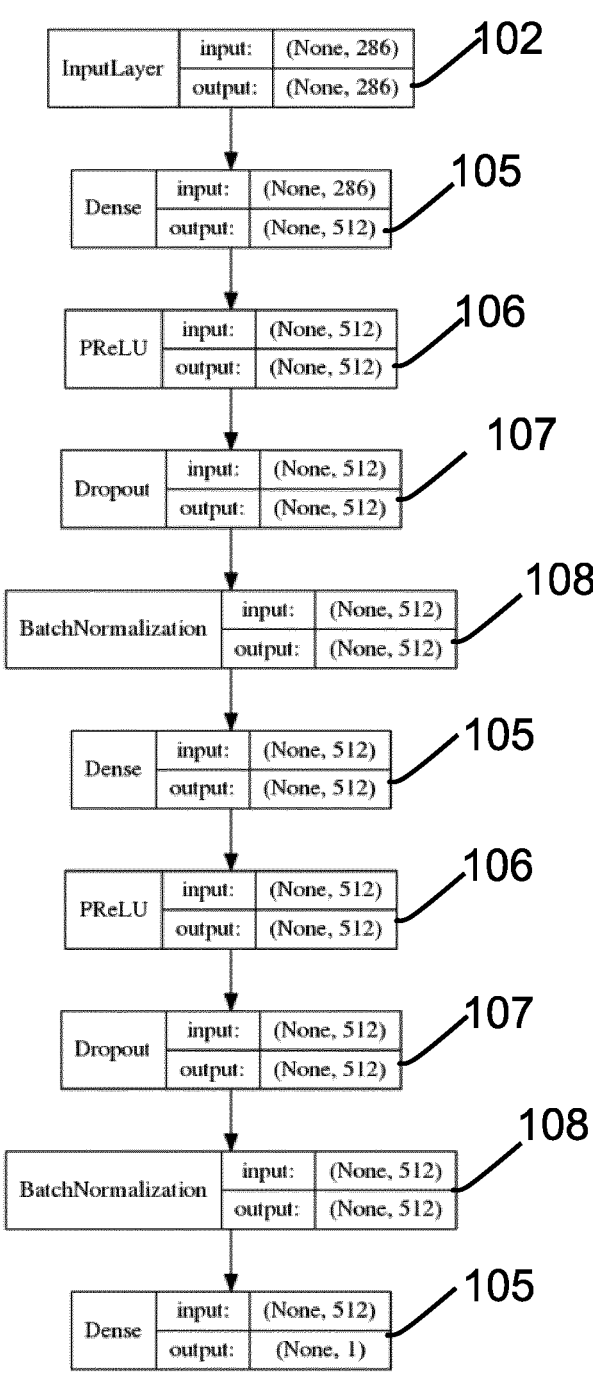
FIG. 3 is a block diagram of an example neural network architecture for a subpixel disparity calculation suitable for use in implementing some embodiments of the present invention.

Implementing system 200 using the neural network 100 of FIGS. 2 and 3 including multiple layers 102, 103, 105, 106, 107, 108, wherein one or more of which may calculate the subpixel disparity and thereby depth maps from the input data using various similarity measures such as cross-correlation. The neural network 100 may be trained to calculate the subpixel disparity between the first image 101L and the second image 101R and thereby depth maps.

Referring to FIGS. 2 and 3, the neural network 100 may include different architectures. The different architectures of FIGS. 2 and 3 may be for example purposes only, and are not intended to be limiting. Different architectures may be contemplated other than those included in the FIGS. 2 and 3 without departing from the scope of the present disclosure. For example, additional or alternative layers or sets of may be used depending on the embodiment. The NN 100 generally comprises an input layer 102, processing layers 103 and an output layer that produces an output number 104 that stands for a calculated subpixel disparity between said first image 101L and said second image 101R, wherein the processing layers 103 include repeated blocks of a specific arrangement of the layers.

The NN 100 may include one or more dense layers 105. The dense layers 105 may be used to perform a core calculation of the subpixel disparity between the first image 101L (i.e., left image) and the second image 101R (i.e., right image).

The NN 100 may apply a Rectified Linear Unit (ReLU), a Parametric Rectified Linear Unit (PReLU), or another activation function at outputs of the dense layers 105. When the PReLU activation functions are not used, the subpixel disparity calculation may be less accurate.

In some examples, such as described herein, layers of the NN 100 may include parameters (e.g., weights and/or biases). The parameters may be learned by the NN 100 during training. Further, some of the layers of the NN may include additional hyper-parameters (e.g., learning rate, epochs, number of neurons, etc.)—such as the dense layers 105—while other layers may not, such as the ReLU or PReLU layers 106. Although PReLU and ReLU activation functions are described herein, various activation functions may be used, including but not limited to, ELU, leaky ReLU, sigmoid, linear, hyperbolic tangent (tan h), etc. The parameters, hyper-parameters, and/or activation functions are not to be limited and may differ depending on the embodiment.

In order to increase the convergence speed, dropout and batch normalization may be used as well. The NN 100 of the computing device may include one or more dropout layers 107 and one or more batch normalization layers 108.

In some examples, the NN 100 of the computing device may be trained for 50,000, or more iterations (e.g., between approximately 100 and 200 epochs), with a batch size of e.g., 1024. In addition, an optimizer may be used in some examples, such as an RMSprop optimizer. In other examples, gradient descent, stochastic gradient descent, or Adam may be used. The learning rate may be, in some examples, $10^{-4}$, which may be reduced over time in some examples by a factor of $10^{-5}$.

The subpixel disparity values calculated by the NN 100 may be used to determine a depth of features in the physical environment represented by the pixels of the images 101. For example, using equation (3), the disparity values may be used to calculate a distance, or depth, of the objects in the physical environment from the device (or another object, such as a drone, robot, etc.). In addition, the calibration of the cameras, or other sensors of the device, may include correlations between pixel positions and x, y coordinates in the physical environment. As such, by also understanding depth, accurate 3D coordinates of objects in the physical environment may be determined (e.g., an x, y, and z location). The location of the objects may be used by the device, or another object, to aid in navigating or otherwise understanding the physical environment.

The empirical experimental results obtained while testing various network architectures indicate that using more dense layers or dense layer(s) with more neurons gives a higher accuracy.

In some examples, the NN 100 may be implemented on an embedded graphics processing unit (GPU). By using an embedded GPU, programmatic optimization may be more achievable. In addition, the NN 100 may be more capable of real-time deployment when using an embedded GPU.

Figure 4:
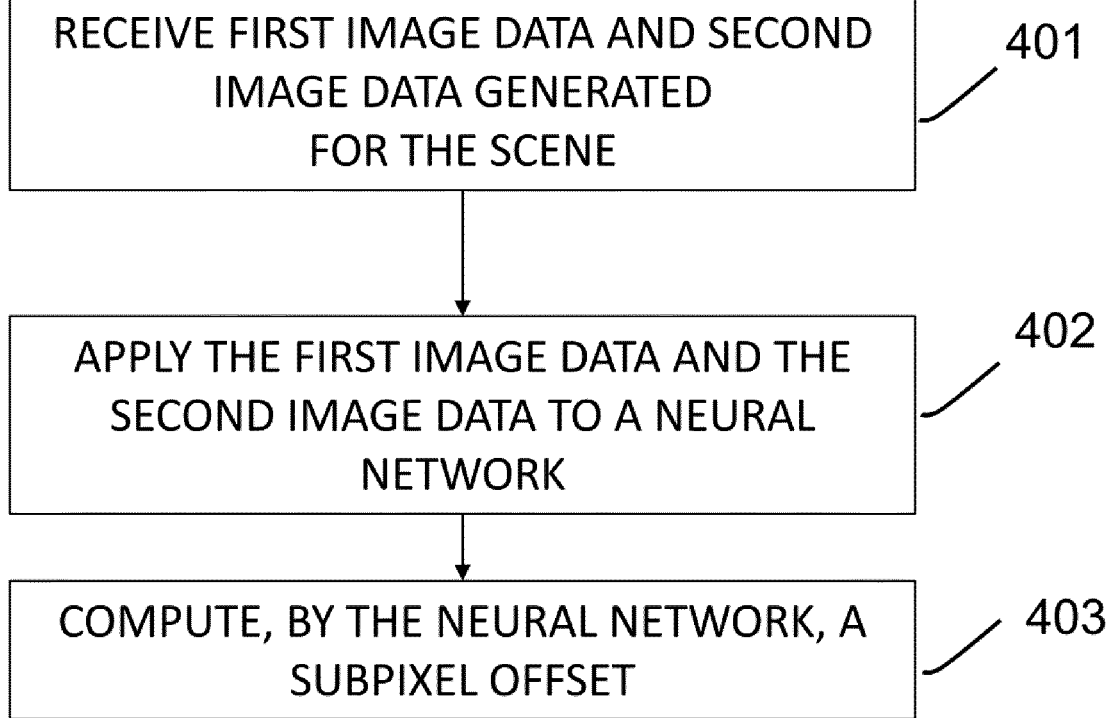
FIG. 4 is a flow diagram illustrating an example computer implemented method for a subpixel disparity calculation using a neutral network, in accordance with some embodiments of the present invention.
Figure 5:
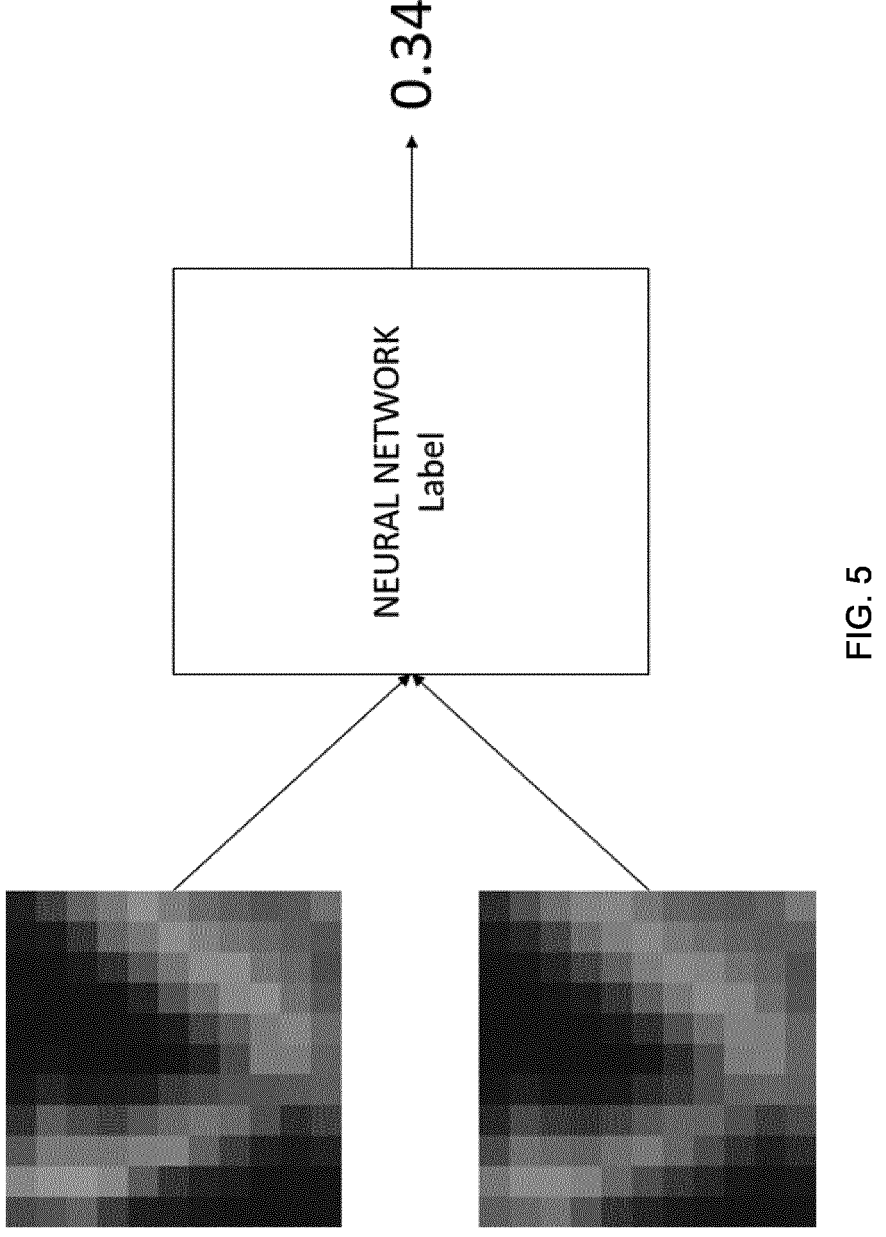
FIG. 5 is a block diagram illustrating an example of using a neural network system for a subpixel disparity calculation from synthetically generated stereoscopic images, in accordance with some embodiments of the present disclosure.

Referring to FIG. 4, each step of the computer implemented method 400, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method is described, by way of example, with respect to the system 200 of FIG. 1. However, the method may additionally or alternatively be executed by any one system, or any combination of systems, including, but not limited to, those described herein.

FIG. 4 is a flow diagram illustrating an example computer implemented method 400 for calculating a subpixel disparity from stereoscopic images using a machine learning model such as the neural network 100, in accordance with some embodiments of the present invention. The method 400, at steps 401, 402, and 403 includes receiving a first image data generated for a scene and a second image data generated for the scene; applying the first image data and the second image data to the machine learning model; and computing, by said machine learning model, the output number 104 that stands for the calculated subpixel disparity between said first image and said second image. For example, a stereo camera may capture the first image 101L and the second image 101R at a same time, and the first image 101L and the second image 101R may be received for use in training the NN 100, that is capturing the first image 101L and the second image 101R of the scene.

The method 400 for the subpixel disparity calculation at step 401 may include receiving the first image data representing the first image 101L and the second image data representing the second image 101R generated for the same scene. It may be based at least in part on one or more comparisons between the image data representative of the first image 101L of a first field of view of a first input device (e.g., a first or left image sensor of the stereo camera) and the image data representative of the second image 101R of a second field of view of a second input device (e.g., a second or right image sensor of the stereo camera).

The method 400, at step 402, includes applying the first image data and the second image data to the machine learning model, wherein said machine learning model is a neural network 100, said neural network 100 is trained in a supervised training mode. For example, the first image data representative of the first image 101L and the second image data representative of the second image 101R may be applied to (or input to) the NN 100 of the computing device.

The method 400, at step 403, includes computing, by the neural network 100, the subpixel disparity 104. For example, the NN 100 of the computing device may compute the subpixel offset.

The method further includes generating synthetic data comprising a plurality of synthetically generated pairs of said first image 101L and said second image 101R, each pair comprising a predetermined subpixel disparity between said first image and said second image.

The machine learning model is trained with the synthetically generated data comprising a training set of pairs of training raw image data representative of a pairs of training raw images with an input number representing a ground truth subpixel disparity between each pair of training raw images.

Example Process of Neural Network Training

Both realistic and synthetically generated images data may be used to train the NN 100 in a supervised manner. By using both realistic and synthetic images data, the benefits of each may be learned by the NN 100 while the drawbacks to each may be mitigated by the other.

According to the present invention, synthetically generated image data is used to train the NN 100 in the supervised manner.

Other benefits of the NNs 100 of the present disclosure may relate to the network architecture. For example, instead of relying on precalculated image patch distances, the NNs 100 perform an end-to-end prediction, i.e., they rely directly on the image patches as their input. This reduces the randomness introduced by distance calculation and it helps to increase the overall prediction accuracy.

To perform supervised training of the NN 100 for estimating the subpixel disparity between two stereo images, it is required to have a training set of pairs of images with known subpixel disparities between them. Such image pairs may be obtained by measuring the camera movement, which may be a hard task, or by simulating the camera movement and its effect on a given image. While the former approach is realistic, it may be problematic to obtain highly accurate subpixel measurements of camera movements. Therefore, simulating the camera movement may be a better and more practical option. One way of doing this is to first record a suitable number of images in a raw linear format. Using such images, the subpixel movements may be simulated by means of simple linear operations. Later a non-linear part of the image processing pipeline may also be simulated in order to make it more like real-world scenarios. The simulation may consist of steps such as white balancing, tone mapping, additive noise, etc., some of which transform the original linear images into non-linear ones, which is a realistic scenario that happens in the image processing pipelines of the majority of the used digital cameras.

The first step for training the NN 100 is to gather enough training data. The training data are synthetically generated images with known subpixel shifts. In the existing literature the simulated speckle images are often used for this purpose. However, their subpixel shifting is usually carried out by means of linear operations as if the intensities in the images taken from cameras are linear, which is not the case as mentioned earlier due to the non-linear operations in image processing pipelines.

FIG. 6 is a flow diagram of an example process of training a neutral network for a subpixel disparity calculation. Generating synthetic data comprising a plurality of synthetically generated pairs of said first image 101L and said second image 101R, each pair comprising a predetermined subpixel disparity between said first image and said second image comprising the steps of: selecting of first training raw images (block 601), simulating a subpixel shift on the first training raw image to obtain the second training raw image (block 602); and applying a set of non-linear operations to the first and second training raw image and obtaining of a first and second training image (block 603) comprising the simulated subpixel shift to obtain the predetermined subpixel disparity between the first and second training image. Each of said first training raw images comprises a matrix of values that represents a patch of linear image intensities. Said first training raw images can be retrieved from a real-world image in its linear form or can be generated randomly. After the first training raw image is retrieved, its subpixel shifting is simulated by using the linear interpolation with the factor of interpolation being controlled by the predetermined subpixel disparity. Since the data of the first training raw image are linear, such interpolation is not detrimental to data shifting accuracy like when generating speckles as described in the literature.

The third step is used to perform the generation of the first and second training image (block 603) by applying to the first and second training raw images a cascade of non-linear operations which may include applying a white balancing method, a tone mapping method, randomly generated additive noise, denoising methods, gamma correction, and other non-linear operations that are usually used in the camera's image processing pipelines. This finishes the generation of the synthetic pair of images that are mutually shifted by the predetermined subpixel disparity. This whole procedure can be repeated any number of times with various values of the first training raw image, predetermined subpixel disparity, or cascade of non-linear operations, which allows the generation of any desired amount of a high-quality plurality of synthetically generated pairs of said first image (101L) and said second image (101R) that can be used as training data.

The neural network 100 is trained with a synthetically generated data comprising a training set of pairs of training raw image data representative of a pairs of training raw images with an input number representing a ground truth subpixel disparity between each pair of training raw images. In order to process left and right stereo images 101L and 101R to calculate subpixel disparity 104, NN 100 can be trained by process 600. Training is accomplished by NN 100 first receiving, at step 601, a first training raw image data representative of a first training raw image. Step 602 includes simulating a subpixel movement of the first training raw image by the input number to obtain a second training raw image data representative of a second training raw image. Step 603 includes converting the first training raw image data representative of the first training raw image into a first training image data representative of a first training image in a prespecified image format, and converting the second training raw image data representative of the second training raw image into a second training image data representative of a second training image in the prespecified image format, and obtaining the first training image data and the second training image data. The prespecified image format corresponds to an image format obtained by the digital camera. At step 604 the neural network 100 computes a training output number based on the first training image data and the second training image data. At step 605 the neural network 100 computes a loss at least in part on comparing the input number to the training output number, and in step 606 one or more parameters of said neural network 100 is updated based at least in part on said loss, wherein backpropagation is used for updating of one or more parameters of said neural network 100.

Example Performance and Comparison

While linear operations used for simulation of subpixel movement should not be used on non-linear sRGB images, they are much more appropriate on images with linear intensities. One example of publicly available datasets with linear images, i.e., raw images whose intensities have not been processed non-linearly, are the NUS benchmark datasets used for benchmarking computational color constancy algorithms as described in document D. Cheng, D. K. Prasad, and M. S. Brown, "Illuminant estimation for color constancy: why spatial-domain methods work as the role of the color distribution", JOSA A 31, 1049-1058 (2014), ref. [6]. According to document [6] the collected dataset (NUS dataset) contains 1736 images from eight different high-end consumer cameras. Out of eight NUS datasets the Canon1 dataset may be used for the purposes of comparation of results obtained by the background art methods and the computer implemented method the present invention. Each of its 259 images may first be delayered by using simple image shrinking without any interpolation to keep the original linear intensities, then its color may be corrected by using the provided ground-truth illumination color, and finally it may be converted to a monochromatic grayscale image. Let I be any of these grayscale images, $I_0$ the cropped version of I without its first and last columns, $I_-$ the cropped version of I without its two last columns, i.e. as if $I_0$ was shifted to the left, and $I_+$ the cropped version of I without its two first columns, i.e. as if $I_0$ was shifted to the right. The simulation of shifting $I_0$ for a subpixel offset o denoted as $I^{(o)}$ can then be calculated as:

$$I^{(o)} = \begin{cases} -oI_- + (1+o)I_0, & \text{if } o < 0 \\ (1-o)I_0 + oI_+, & \text{otherwise.} \end{cases} \quad (4)$$

Eq. (4) may be applied to each of 259 grayscale images to create additional 101 images for every $o \in \{-0.5, -0.49, \ldots, 0.49, 0.5\}$. All these images may be tone-mapped by a tone-mapping operator (TMO) to compress their high dynamic range to the one of the most commonly used sRGB images, i.e. to 8 bits per color channel. After tone-mapping may have been applied, the resulting images may not be linear anymore since TMOs carry out non-linear operations. If $I'_O$ and $I^{(o)\prime}$ denote the tone-mapped version of $I_O$ and $I^{(o)}$, respectively, then there may finally be $259 \times 101 = 26159$ pairs $(I'_O, I^{(o)\prime})$ with a known mutual subpixel shift of o. While these images would effectively contain only a single subpixel offset plane, they would still be technically more mature than the previously used simulations and they may be used as the source of data required to approach the problem of subpixel offset calculation with some form of machine learning such as neural networks.

While stereo algorithms usually calculate the subpixel offset of all pixels, in some other applications only the subpixel offset of patches around certain keypoints is calculated. Since keypoints are usually centered around image corners, registering the corresponding patches can sometimes be a challenging problem. Therefore, to generate the training data from the created image pairs, in both images of each of 26159 pairs up to 500 most prominent ORB features (Oriented FAST and Rotated BRIEF) may be detected by using the default OpenCV ORB feature detector and they may then be matched. Since the images would be generated in controlled conditions, it would be possible to retain only the true matches. For each match around both keypoints a $11 \times 13$ patch may be extracted, which would give a feature vector size of $2 \times 11 \times 13 = 286$. The patch size $11 \times 13$ may be chosen because well-known and widely used algorithms such as e.g. ORB-SLAM2 use $11 \times 11$ patches, but for the needs of parabola fitting they also use two additional patches shifted one column to the left and one column to the right. Hence, for the sake of having enough information for all methods that are tested, the patches extracted here may have $11+2=13$ columns.

Such data may be generated for several varying conditions. For the TMO the plain gamma correction may be used due to its wide application and the Flash TMO (see document N. Banić and S. Lončarić, "Flash and Storm: Fast and Highly Practical Tone Mapping based on Naka-Rushton Equation," in 13th International Joint Conference on Computer Vision Theory and Applications (VISAPP 2018), (2018), pp. 47-53, ref. [7]) due to its simplicity and high-quality results. In both of these cases the keypoints may be detected and the feature vectors may be extracted without any noise and with added Gaussian noise of mean of 0 and standard deviation of 20. When no noise is added, then for both of the used TMOs there may be almost 10 million feature vectors created, while in the case of added noise the number of created feature vectors may be around 6.5 and 4.9 million for Flash and gamma correction, respectively. In all of these cases the feature vectors from the first 207 images may be used for the train set, the vectors from the next 26 images may be used for the validation set, and the vectors from the last 26 images may be used for the test set. This roughly corresponds to a 0.8: 0.1: 0.1 train-validation-test split.

A table of one example architecture of a neural network architecture is given in FIG. 8 which provides testing validation of a relatively simple network architecture. PReLU (Parametric Rectified Linear Unit), that generalizes the traditional rectified unit, is used for non-linear activation due to its speed and simplicity. In order to increase the convergence speed, dropout and batch normalization may be used as well. The batch size may be set to 1024. For the network optimization the RMSprop algorithm (Root Mean Square Propagation) may be used. The learning rate may be set to $10^{-4}$ with a decay rate of $10^{-5}$. After several hundred epochs the model with weights which resulted in the lowest mean square error on the validation set may be used to check accuracy on the test sets. It should be understood that batch size and use of RMSprop algorithm described herein are set forth only as example. Other arrangements and elements may be used in addition to or instead of those shown, and some elements may be omitted altogether.

Overall, four methods were tested: the parabola fitting described by Eq. (1) due to its wide usage, its improvement described in ref. [2], the method described by Eq. (2) in ref. [4] due to its sound theoretical background and reliance on the actual patches instead of patch distances, and the method and neural network 100 of the present invention.

While many other methods exist, they were not used for comparison because they are either very similar to parabola fitting in the conditions that are present in the test images, or their accuracy is similar to the one of the used methods. The obtained results are presented in FIG. 9 where the four used methods are denoted as parabola [1], shifted [2], linear [4], and the proposed method of the present invention, respectively.

It can be seen that the method according to the present invention outperforms all other methods in all cases, but with the distinction that other methods are always used out-of-the-box, while the proposed method may always be retrained on the test sets' respective train sets. In all cases the performance of all methods may be better when there was no noise. Another interesting result is that the linear method is affected particularly bad by noise, which even leads the parabola fitting method to outperform it in the case of noise presence. The method of the present invention also obtained lower standard deviation of the subpixel offset estimation errors than other compared methods.

Figure 10:
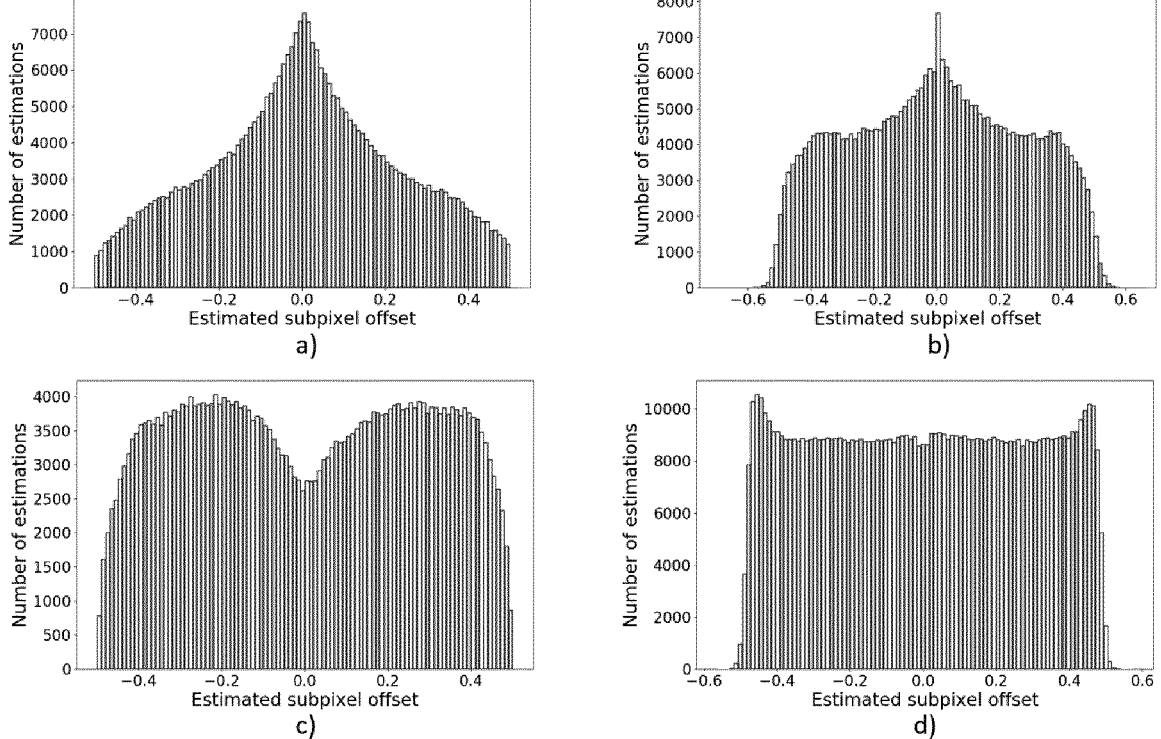
FIG. 10 is a histogram of subpixel calculations obtained on subsamples of ground-truth with a uniform distribution when Flash from ref. [7] is used as the tone mapping operator (TMO) with no noise by applying (a) parabola fitting from ref. [1], (b) the method described in ref. [2], (c) the linear method from ref. [4], and (d) a computer implemented method in accordance with some embodiments of the present invention.

If the compared methods are applied to subsamples of ground-truth with uniform distributions, then the corresponding distributions of their subpixel offset estimations are as shown in FIG. 10. The histogram for the parabola fitting has a distinctive mark of pixel locking as reported in other publications. In the case of the linear method, ref. [4], the pixel locking is also present, but to a lesser degree. Finally, the proposed method has the distribution that is by far the closest one to the uniform distribution, which can also be seen as an advantage over other methods.

Another interesting thing to observe is the difference in the performance of all methods depending on the used TMO, which means that even the image processing pipeline also plays an important role in the overall accuracy of subpixel registration. As a matter of fact, even the number of features obtained by using the default ORB settings vectors may be higher in the case when Flash is used as the TMO, which means that more ORB keypoints may be detected and matched.

To see how a network trained on the patches from images of one kind behaves when applied to the patches from images of another kind, an experiment may be carried out where the network with parameters trained on train sets of each of the four kinds of images listed in FIG. 9 is also tested on test sets of all four image kinds and the obtained results are shown in a table in FIG. 11. It can be seen that for any combination of the train and test sets that have the same presence of noise the proposed method outperforms other methods even when other TMOs are used. However, when the train set has no noise, but the test set does, the proposed network obtains a higher error than parabola fitting. In the opposite case when the train set has noise and the test set does not, the method of the present invention outperforms parabola fitting and the linear method, but it still has a significantly higher error than when the training is performed without the presence of noise.

Therefore, another experiment may be carried out in order to see whether the network can be trained to be more resilient to varying conditions such as the used TMO or the presence or absence of noise. All of the previously used train sets may be merged into a single combined train set and the same may be done with the validation sets. After that the network may be trained by using the new train and validation with the same architecture and hyperparameters as before. The obtained results are shown in a table in FIG. 12. It can be seen that the proposed method trained on the combined train set outperforms the parabola fitting and the linear method on all test sets and additionally on the test sets with noise it also slightly outperforms the proposed method trained only on train sets with noise. This all effectively means that the method of the present invention may be trained to adjust to multiple image domains simultaneously and thus also avoid overfitting.

Example Computing Device

Figure 7:
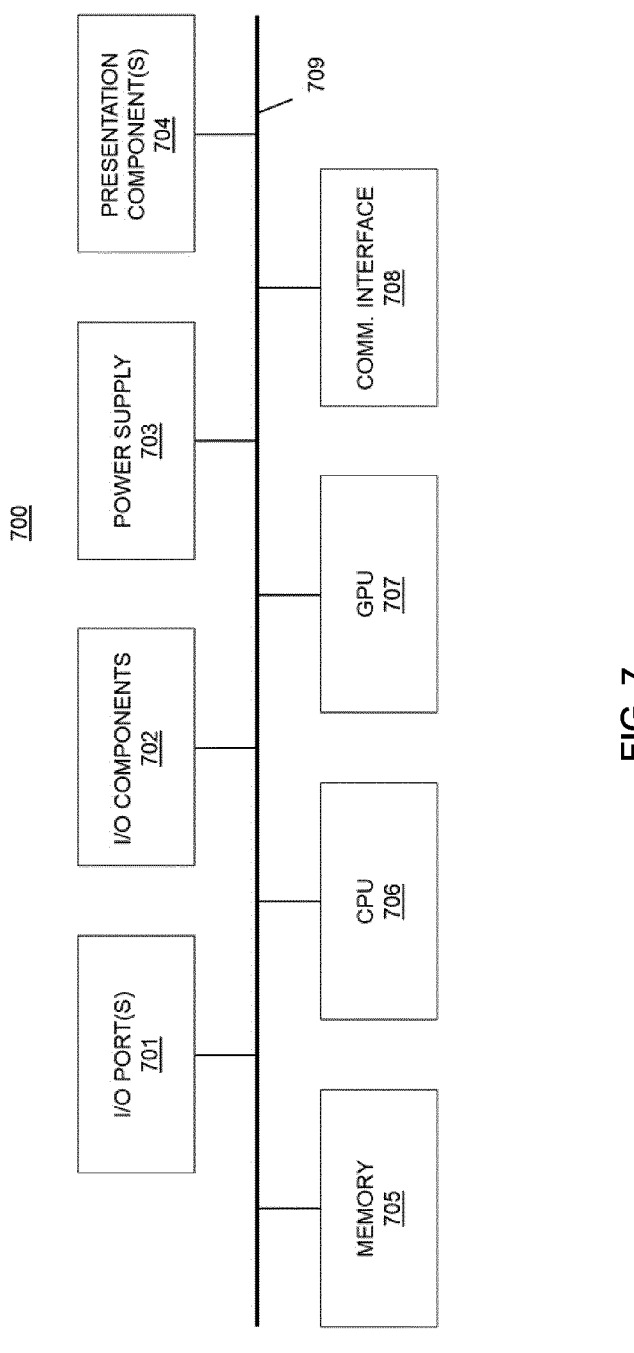
FIG. 7 is a block diagram of an example computing device suitable for use in implementing some embodiments of the present invention.

FIG. 7 is a block diagram of an example computing device suitable for use in implementing some embodiments of the present invention. Computing devices can receive information regarding the operation of the device from sensors. The computing device includes a processor and a memory such as are known. Further, the memory includes one or more forms of computer-readable media, and stores instructions executable by the processor for performing various operations, including as disclosed herein. The computing device may include or be communicatively coupled to, e.g., via a device communications bus as described further below, more than one computing devices, e.g., controllers or the like included in the device for monitoring and/or controlling various device components. In addition, the computing device may be configured for communicating through a device-to-infrastructure (D-to-I) interface with a remote server computer, e.g., a cloud server, via a network, which may utilize various wired and/or wireless networking technologies, e.g., cellular, BLUETOOTH® and wired and/or wireless packet networks. The computing device also includes non-volatile memory such as are known. Computing device can log information by storing the information in non-volatile memory for later retrieval and transmittal via the device communication network and D-to-I interface to a server computer or user mobile device. The device may include one or more different sensors and image sensors. Sensors may include a variety of devices known to provide data via the device communications bus. The sensors may be programmed to collect data related to the device and the environment in which the device is operating. By way of example, and not limitation, sensors may include e.g., altimeters, cameras, LiDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors may be used to sense the environment in which the device is operating. Image sensors may be cameras used to capture image data around an entire periphery of the device. The types of cameras used depends on the embodiments and requirements for the device, and any combination of camera types may be used to provide the necessary coverage around the device. The device may further include any number of camera types, including one or more stereo camera(s), wide-view camera(s), infrared camera(s), surround camera(s), long-range and/or mid-range camera(s), and/or other camera types. In addition, the number of cameras may differ depending on the embodiment. However, this is not intended to be limiting. For example, and without departing from the scope of the present disclosure, the systems, methods, and/or processes described herein may be applicable to digital image correlation, virtual reality (VR) systems, augmented reality (AR) systems, and/or any other type of technology that may use subpixel disparity or depth information.

Referring to FIG. 7, the computing device 700 may include a bus 709 that directly or indirectly couples the following devices: memory 705, one or more central processing units (CPUs) 706, one or more graphics processing units (GPUs) 707, a communication interface 708, input/output (I/O) ports 701, input/output components 702, a power supply 703, and one or more presentation components 704 (e.g., display(s)).

Although the various blocks of FIG. 7 are shown as connected via the bus 709 with lines, this is not intended to be limiting and is for clarity only. For example, in some embodiments, a presentation component 704, such as a display device, may be considered an I/O component 701 (e.g., if the display is a touch screen). As another example, the CPUs 706 and/or GPUs 707 may include memory (e.g., the memory 705 may be representative of a storage device in addition to the memory of the GPUs 707, the CPUs 706, and/or other components). In other words, the computing device of FIG. 7 is merely illustrative. Distinction is not made between such categories as "workstation", "server", "laptop", "desktop", "tablet", "client device", "mobile device", "hand-held device", "game console", "electronic control unit (ECU)", "virtual reality system", and/or other device or system types, as all are contemplated within the scope of the computing device of FIG. 7.

The bus 709 may represent one or more busses, such as an address bus, a data bus, a control bus, or a combination thereof. The bus 709 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 705 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 705 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 706 may be configured to execute the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an ARM processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

The GPU(s) 707 may be used by the computing device 700 to render graphics (e.g., 3D graphics). The GPU(s) 707 may include hundreds or thousands of cores that are capable of handling hundreds or thousands of software threads simultaneously. The GPU(s) 707 may generate pixel data for output images in response to rendering commands (e.g., rendering commands from the CPU(s) 606 received via a host interface). The GPU(s) 707 may include graphics memory, such as display memory, for storing pixel data. The display memory may be included as part of the memory 705. The GPU(s) 707 may include two or more GPUs operating in parallel (e.g., via a link). When combined together, each GPU 707 may generate pixel data for different portions of an output image or for different output images (e.g., a first GPU for a first image and a second GPU for a second image). Each GPU may include its own memory, or may share memory with other GPUs.

In examples where the computing device 700 does not include the GPU(s) 707, the CPU(s) 706 may be used to render graphics.

The communication interface 708 may include one or more receivers, transmitters, and/or transceivers that enable the computing device 700 to communicate with other computing devices via an electronic communication network, included wired and/or wireless communications. The communication interface 708 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 701 may enable the computing device 700 to be logically coupled to other devices including the I/O components 701, the presentation component(s) 704, and/or other components, some of which may be built in to (e.g., integrated in) the computing device 700. Illustrative I/O components 702 include a microphone, mouse, keyboard, joystick, game pad, game controller, satellite dish, scanner, printer, wireless device, etc. The I/O components 702 may provide a natural user interface (NUI) that processes air gestures, voice, or other physiological inputs generated by a user. In some instances, inputs may be transmitted to an appropriate network element for further processing. A NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 703 may include a hard-wired power supply, a battery power supply, or a combination thereof. The power supply 703 may provide power to the computing device 700 to enable the components of the computing device 700 to operate.

The presentation component(s) 704 may include a display (e.g., a monitor, a touch screen, a television screen, a heads-up-display (HUD), other display types, or a combination thereof), speakers, and/or other presentation components. The presentation component(s) 704 may receive data from other components (e.g., the GPU(s) 707, the CPU(s) 706, etc.), and output the data (e.g., as an image, video, sound, etc.).

Computing devices such as those discussed herein generally each include instructions executable by one or more computing devices such as those identified above, and for carrying out blocks or steps of methods described above. For example, method blocks discussed above may be embodied as computer-executable instructions.

Computer-executable instructions may be compiled or interpreted from computer programs created using a variety of programming languages and/or technologies, including, without limitation, and either alone or in combination, Java™, C, C++, C #, Visual Basic, Java Script, Python, Perl, Rust, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Additional Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network. [0202] The systems and methods of the disclosure each have several innovative aspects, no single one of which is solely responsible or required for the desirable attributes disclosed herein. The various features and processes described herein may be used independently of one another, or may be combined in various ways. All possible combinations and sub-combinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

In the drawings, the same reference numbers indicate the same elements. Further, some or all of these elements could be changed. With regard to the media, processes, systems, methods, etc. described herein, it should be understood that, although the steps of such methods, etc. have been described as occurring according to a certain ordered sequence, such methods could be practiced with the described steps performed in an order other than the order described herein. It further should be understood that certain steps could be performed simultaneously, that other steps could be added, or that certain steps described herein could be omitted. In other words, the descriptions of methods herein are provided for the purpose of illustrating certain embodiments, and should in no way be construed so as to limit the claimed invention.

LIST OF REFERENCES

[1] Q. Tian and M. N. Huhns, Comput. Vision, Graph. Image Process. 35, 220-233 (1986);

[2] M. Shimizu and M. Okutomi, "Significance and attributes of subpixel estimation on area-based matching, Systems and Computers in Japan, 33, 1-10 (2002);

[3] D. Nehab, S. Rusinkiewiez, and J. Davis, "Improved sub-pixel stereo correspondences through symmetric refinement," in Tenth IEEE International Conference on Computer Vision (ICCV'05) Volume 1, vol. 1 (IEEE, 2005), pp. 557-563;

[4] Wei Tong "Subpixel image registration with reduced bias" published in Opt. letters Vol. 36, Issue 5, pp. 763-765 (2011);

[5] "Stereo Matching by Training a Convolutional Neural Network to Compare Image Patches" by J. Žbontar, Y. LeCun et al., J. Mach. Learn. Res. 17, 2 (2016);

[6] D. Cheng, D. K. Prasad, and M. S. Brown, "Illuminant estimation for color constancy: why spatial-domain methods work as the role of the color distribution", JOSA A 31, 1049-1058 (2014);

[7] N. Banić and S. Lončarić, "Flash and Storm: Fast and Highly Practical Tone Mapping based on Naka-Rushton Equation," in 13th International Joint Conference on Computer Vision Theory and Applications (VISAPP 2018), (2018), pp. 47-53.

[8] Lidong Yu, Yucheng Wang, Yuwei Wu, and Yunde Jia. "Deep Stereo Matching with Explicit Cost Aggregation Sub-Architecture." Proceedings of the AAAI Conference on Artificial Intelligence. Vol. 32. No. 1. 2018.

[9] Alex Kendall, Hayk Martirosyan, Saumitro Dasgupta, Peter Henry, Ryan Kennedy, Abraham Bachrach, and Adam Bry. "End-to-End Learning of Geometry and Context for Deep Stereo Regression." Proceedings of the IEEE International Conference on Computer Vision. 2017.; and

[10] Hyunmin Lee and Yongho Shin. "Real-Time Stereo Matching Network with High Accuracy." 2019 IEEE International Conference on Image Processing (ICIP). IEEE, 2019.

The invention claimed is:

1. A computer implemented method for processing image data, the method comprising:

providing one or more processors;

configuring the one or more processors to receive first image data for a first image of a field of view and second image data for a second image of the field of view;

configuring the one or more processors to apply the first image data and the second image data to a machine learning model, wherein the machine learning model is a neural network;

configuring the one or more processors to compute, by the machine learning model, an output number that represents a calculated subpixel disparity between the first image and the second image; and configuring the one or more processors to train the neural network with synthetic data, wherein the synthetic data comprises one or more synthetically generated pairs of the first image and the second image, each pair of said one or more synthetically generated pairs comprising a predetermined subpixel disparity between the first image and the second image.

2. The method of claim 1, further comprising a first input device configured to obtain the first image data, and a second input device configured to obtain the second image data.

3. The method of claim 1, wherein the first input device and the second input device each include one or more digital cameras, computer readable medium, or both.

4. The method of claim 1, further comprising configuring the one or more processors to train the neural network in a supervised training mode, wherein the supervised training mode comprises:

receiving a first training raw image data representative of a first training raw image;

simulating a subpixel movement of the first training raw image by an input number to obtain second training raw image data representative of a second training raw image;

converting the first training raw image data representative of the first training raw image into first training image data representative of a first training image in a prespecified image format by applying a set of non-linear operations, wherein the prespecified image format corresponds to an image format obtained by a digital camera;

converting the second training raw image data representative of the second training raw image into second training image data representative of a second training image in the prespecified image format by applying the set of non-linear operations; and obtaining the first training image data and the second training image data.

5. The method of claim 4, further comprising:

computing, by the neural network, a training output number based on the first training image data and the second training image data;

computing, by the neural network, a loss, at least in part on comparing the input number to the training output number; and updating of one or more parameters of the neural network based at least in part on the loss.

6. The method of claim 5, further comprising:

using backpropagation for updating one or more parameters of the neural network.

7. The method of claim 1, further comprising:

providing a computer program directly loadable into an internal memory of the one or more processors, the computer program comprising software capable of controlling the steps of claim 1 when the program is run on the one or more processors.

8. The method of claim 1, further comprising:

providing a computer readable medium having a computer program recorded thereon, wherein the computer program is configured to permit the one or more processors to control the steps of claim 1.

9. The method of claim 1, wherein the output number is a single scalar value.

10. The method of claim 1, wherein the synthetic data further comprises a training set of pairs of training raw image data.

11. The method of claim 10, wherein the training set of pairs of training raw image data represents pairs of training raw images having an input number, wherein the input number represents a ground truth subpixel disparity between each pair of training raw images.

12. A system for processing image data, the system comprising:

one or more processors;

a non-transitory, computer readable medium, configured with instructions that, when executed by the one or more processors, cause the system to implement a neural network comprising an input layer configured to receive first image data for a first image of a field of view and second image data for a second image of the field of view;

wherein the neural network is configured to provide an output number that represents a calculated subpixel disparity between the first image and the second image; and wherein the one or more processors are configured to train the neural network with synthetically generated data comprising one or more synthetically generated pairs of the first image and the second image, each pair of said one or more synthetically generated pairs comprising a predetermined subpixel disparity between the first image and the second image.

13. The system of claim 12, wherein the output number is a single scalar value.

14. The system of claim 12, further comprising a dense layer configured to process the first image data and the second image data, and a parametric rectified linear layer capable of performing non-linear processing of the first image data and the second image data.

15. The system of claim 14, further comprising a dropout layer, and a batch normalization layer.

16. The system of claim 12, wherein the one or more synthetically generated pairs comprise one or more pairs of training raw images with an input number representing a ground truth, said training raw images formed by simulating a predetermined sub-pixel shift between the images.

\* \* \* \* \*